(12) United States Patent
Shimizu et al.

(10) Patent No.: US 8,349,953 B2
(45) Date of Patent: Jan. 8, 2013

(54) RESIN MELTING AND SHEARING METHOD, RESIN MOLDING PROCESSING METHOD AND RESIN PRODUCTS

(75) Inventors: Hiroshi Shimizu, Tsukuba (JP); Yongjin Li, Hangzhou (CN); Toshiyuki Imoto, Kyoto (JP)

(73) Assignee: National Institute of Advanced Industrial Science and Technology, Tsukuba-shi (JP)

( * ) Notice: Subject to any disclaimer, the term of this patent is extended or adjusted under 35 U.S.C. 154(b) by 1162 days.

(21) Appl. No.: 11/505,288

(22) Filed: Aug. 17, 2006

(65) Prior Publication Data

US 2008/0045657 A1    Feb. 21, 2008

(51) Int. Cl.
*C08K 3/34*    (2006.01)
*C08L 67/04*   (2006.01)
*C08L 77/00*   (2006.01)

(52) U.S. Cl. ......... 525/165; 525/166; 525/178; 525/179

(58) Field of Classification Search ............... 525/165, 525/166, 178, 179
See application file for complete search history.

(56) References Cited

U.S. PATENT DOCUMENTS 4,990,557 A * 2/1991 Lee ............................... 524/494

FOREIGN PATENT DOCUMENTS

JP    2005-313608    11/2005

OTHER PUBLICATIONS

Hiroshi Shimizu et al., "Formation of Nanostructured PVDF/PA11 Blends Using High-Shear Processing", Macromolecules 2005, 38, pp. 7880-7883.

* cited by examiner

*Primary Examiner* — Ana Woodward
(74) *Attorney, Agent, or Firm* — Westerman, Hattori, Daniels & Adrian, LLP

(57) ABSTRACT

The invention provides a method of obtaining a compatible resin blend from at least two incompatible resins which are not conventionally blended with each other. The blend of an incompatible resins is dissolved at a molecular level by being melted and sheared under a high shearing rate by rotating a screw without adding a compatibilizer or the like.

8 Claims, 11 Drawing Sheets
(8 of 11 Drawing Sheet(s) Filed in Color)

(a)

(b)

RESIN MELTING AND SHEARING METHOD, RESIN MOLDING PROCESSING METHOD AND RESIN PRODUCTS

FIELD OF THE INVENTION

The present invention is to provide a method of obtaining a compatible resin blend from at least two incompatible resins which are not conventionally blended with each other.

BACKGROUND OF THE INVENTION

A growing fraction of plastic resins produced today are blends of two or more polymers. Polymer blending offers an extraordinary rich range of new materials with enhanced characteristics regarding mechanical, chemical or optical performances. However, most commercial blends are immiscible because nearly all polymer pairs cannot be soluble in each other. When two immiscible polymers are blended during melt extrusion, a stable morphology is reached in which one phase is mechanically dispersed inside the other. The size and shape of the dispersed phase depends on several processing parameters including rheological and interfacial properties, and the composition of the blend. By using the conventional mixing machines, the experimental limitation of domain size has been reported to be approximately 100 nm and 350 nm for Newtonian systems and polymer blend systems, respectively. Several methods of reducing phase size and improving interfacial adhesion for the practical application of polymer blend materials have been developed. Currently, a phase structure on the micrometer or submicrometer scale, that is, microstructured blends, is technically easy to prepare using typical processing methods, such as extrusion or injection molding. However, the preparation of nanostructured polymer blends for immiscible polymers, with a phase size of less than 100 nanometers, is very challenging using normal processing methods currently available. Very recently, nanostructured blends have been produced from block copolymers by using conventional melt processing, but the method shows obvious limitation for the practical application.

SUMMARY OF THE INVENTION

An object of the present invention is to provide a method of obtaining a compatible resin blend by means of an enhanced condition in a melting and shearing apparatus from at least two incompatible resins which are not conventionally blended with each other. The a mixture of incompatible resins is dissolved at a molecular level by being melted and sheared under a high shearing rate by rotating a screw without adding a compatibilizer or the like.

Another object of the present invention is to provide a method of obtaining compatible resin blend from at least two incompatible resins by generating a high shearing rate of a range from 900 to 4500 sec−1. and by rotating rate a screw at a rotation of 600 rpm or more, more preferably, 1000 rpm or more.

Another object of the present invention is to provide a compatible resin blend made by using the melting and shearing method according to the present invention.

According to the melting and shearing method of the present invention, a high shearing rate is generated by rotating the screw at a high speed, and a feedback type screw structure is adopted, thereby sufficiently shearing the resin provided by moving the resin backward and forward inside in a cylinder.

The screw is an inner feedback type structure in which at least two incompatible resins is sufficiently melted and sheared inside the cylinder. The inner feedback type screw is a structure in which a resin loaded from a subsequent stage of the screw is sufficiently sheared during being fed to a preceding stage of the screw by the screw. And, the sheared resin is blocked in a gap formed between a tip end surface of the screw and a sealing surface opposed to the tip end surface. Therefore, the sheared resin is further loaded in a hole provided in a longitudinal direction of a substantial central portion of the screw. And then the resin is returned to the subsequent stage of the screw again.

The melted and sheared resin is fed from a rear end of the screw to a front end thereof to be blocked in a gap provided in the front end of the screw, and returning to the rear end of the screw from the gap through the inner hole of screw.

According to the structure of the feedback type screw, time required for shearing can be arbitrarily changed. A degree of shearing the resin can be changed by adjusting the gap formed between the tip end surface of the screw and the sealing surface opposed to the tip end surface, and an inner diameter of the hole of the screw. In other words, the degree of shearing is increased by narrowing the gap and by reducing the size of the inner diameter of the hole.

A compatible resin blend contains miscible resin.

A two incompatible resin has a poly(vinylidene fluoride) of 97 to 20 weight %, and a polyamide resin of 3 to 80 weight %.

The polyamide resin comprises one selected from group of a nylon 6, a nylon 11, a nylon 46, or a nylon 66.

A two incompatible resin comprises a poly(vinylidene fluoride) and a polyester resin.

The polyester resin comprises one selected from group of a polylactic acid, polycarbonate, poly(ethylene terephthalate), or poly(butylene terephthalate).

Another object of the present invention is to provide a molding method of a resin obtained by the melding and shearing method according to the present invention.

Another object of the present invention is to provide a resin product such as a rod, a film, a sheet, or a fiber, which is obtained by the molding processing method according to the present invention.

According to the method of the invention, at least two incompatible resins are dispersed precisely without adding compatibilizers. And, according to the method of the invention, a nanostructured blend is processed with a surfiricantly increased elongation at breakup.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

Figure 1:
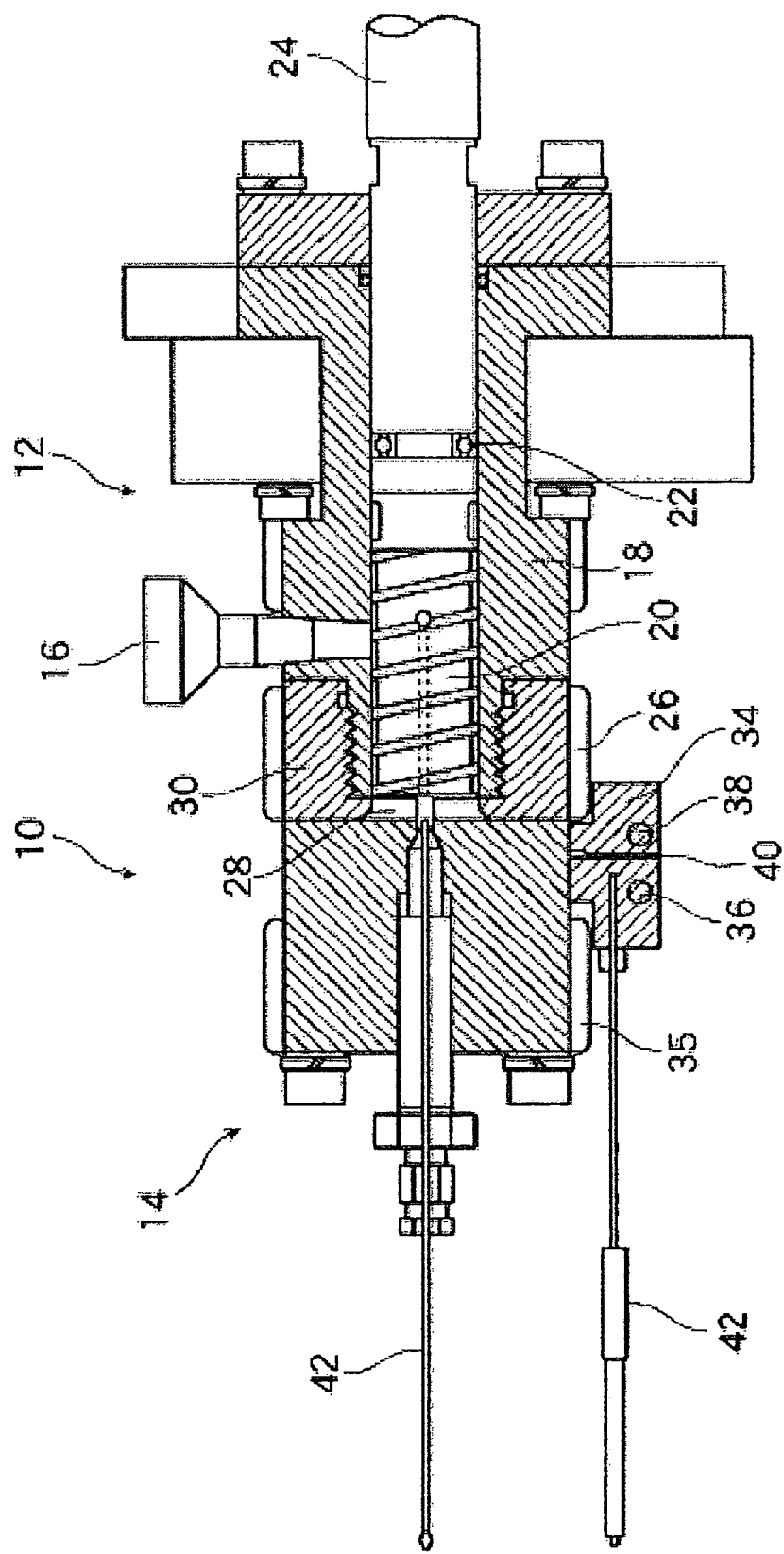
FIG. 1 is a schematic illustration of a resin processing system according to the invention.

With reference to FIG. 1, a resin processing system 10 includes a melting and shearing apparatus 12 and a molding apparatus 14. The molding apparatus 14 includes an extrusion molding apparatus or an injection molding apparatus.

The melting and shearing apparatus 12 provides a resin supplying part 16, a cylinder 18, a feedback type screw 20 which is inserted in the cylinder 18, and a shaft 24 which is connected to the cylinder 18 through a bearing 22. The cylinder 18 includes a heater 26 for melting the resin contained in the cylinder. The cylinder 18 further includes a sealing member 28 for sealing between a melting and shearing apparatus 12 and the molding apparatus at an end portion of the cylinder 18 which is opposed to the shaft 24. The cylinder 18 further includes an adjusting means 30 for adjusting a gap 32 formed between a tip end surface 29 of the screw 20 and a sealing surface 28 opposed to the tip end surface 29 at the molding apparatus side thereof. The gap 32 is adjusted within a range of about 0.5 mm to about 5 mm.

The molding apparatus 14 includes an extruded part heater 35 and a T-die 34 for film formation. The T-die 34 includes a T-die tip-end heater 36 and a T-die rear-end heater 38. An extruded film passes an outlet 40 provided between the T-die tip-end and rear-end heaters. A thermo-couple 42 is inserted into the molding zone and the T-die tip end heaters, thereby measuring temperature thereof. A measurement result is sent to a controlling device (not shown) to adjust each temperature of the melting and mixing zone 12 and the T-die.

An enhanced condition in the melting and shearing apparatus is explained as follows. The screw 20 has a inner hole 44 having an inner diameter set into a range from about 1 mm to about 5 mm, preferably, in a range from about 2 mm to about 4 mm. The L/D(L; length, D; diameter) of the feedback-type screw has 1.78. A rotation speed of the screw is set into a range from 600 rpm to 3000 rpm, and a shear rate of the screw is set into a range from 900 to 4500 sec–1.

The temperature within the cylinder varies depending on a resin to be melted and sheared. The temperature is set to a temperature which is about 50° C. higher than the temperature of the resin to be melted and mixed from a room temperature.

Figure 2:
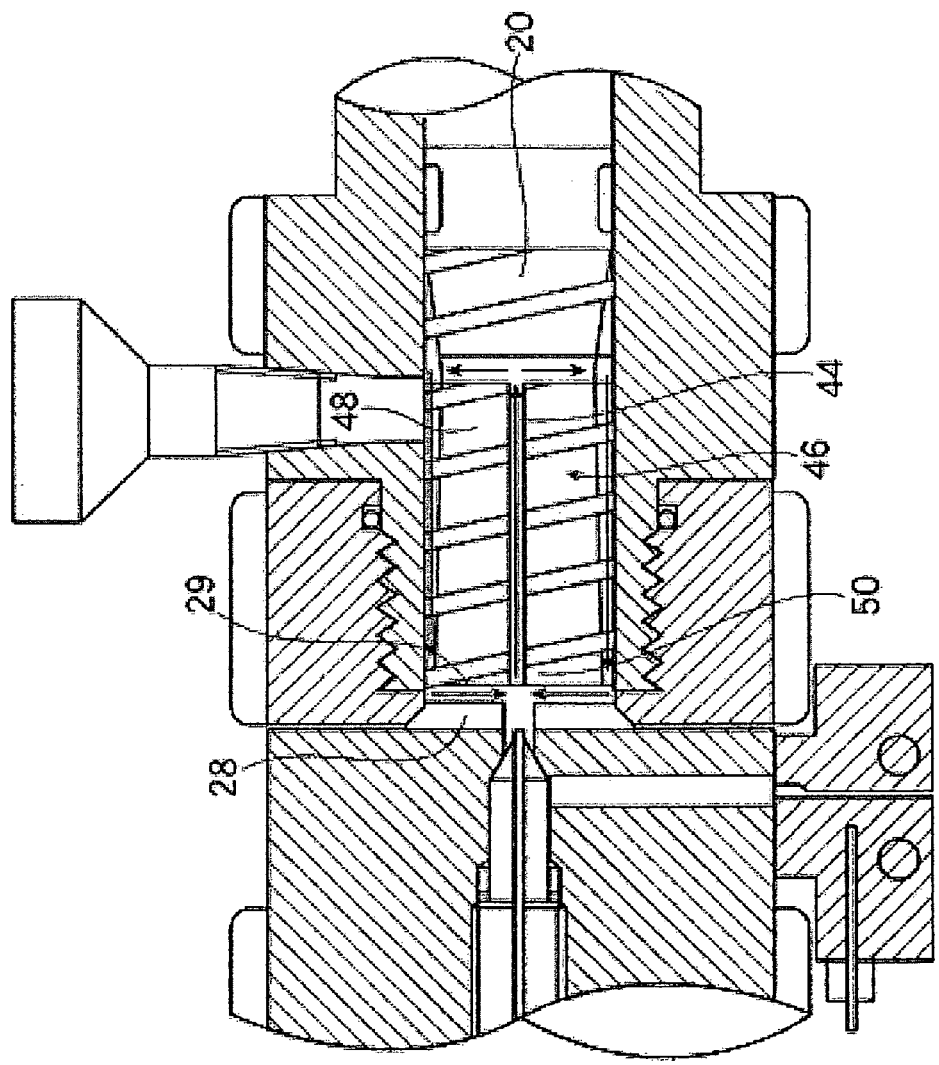
FIG. 2 is a schematic illustration of inner feedback type screw in a melting and shearing apparatus according to the invention.
Figure 3:
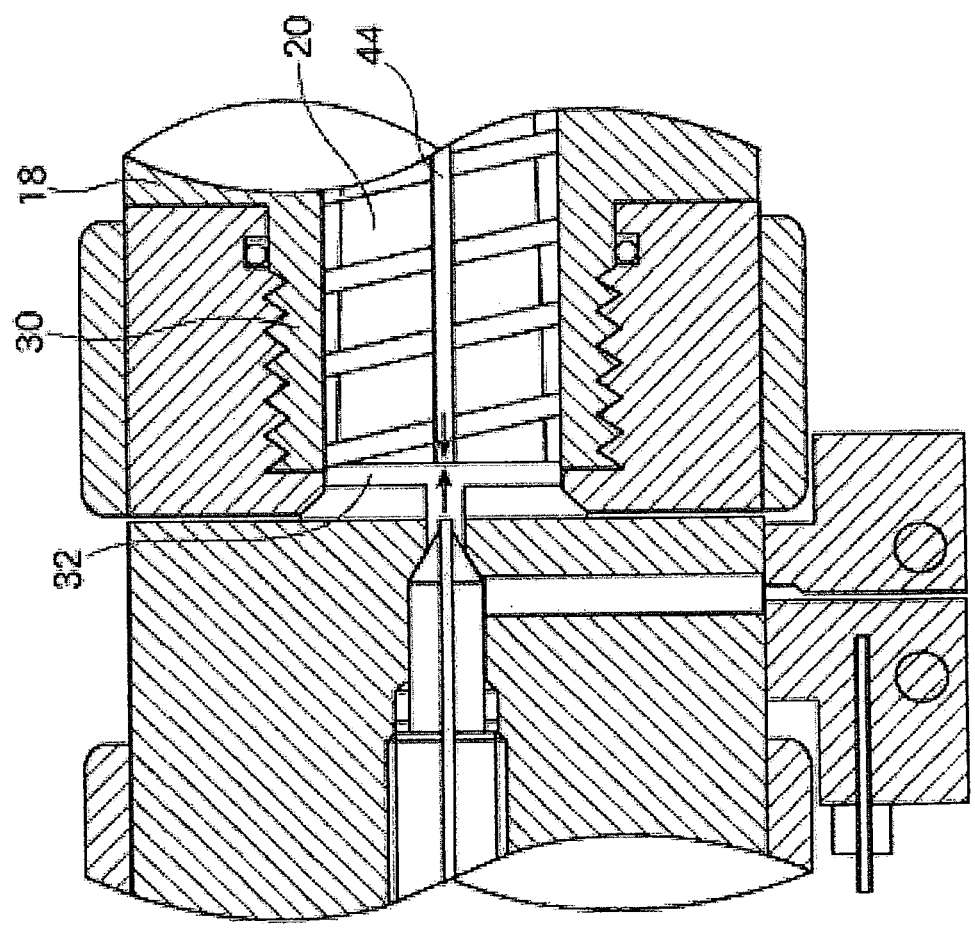
FIG. 3 is a schematic illustration of a gap provided in the front end of the inner feedback type screw in a melting and shearing apparatus according to the invention.

The screw has a structure in which at least two incompatible resins is sufficiently melted and sheared inside the cylinder. FIG. 2 shows an inner feedback screw type structure 46. In the inner feedback screw type structure 46, a resin loaded from a screw rear stage 48 is sufficiently melted and sheared during being fed to a screw front stage 50 by the screw. The melted and sheared resin is blocked in the gap 32 formed between the tip end surface 29 of the screw and the sealing surface 28 opposed to the tip end surface. And the resin is further loaded in the hole 44 provided in a longitudinal direction of a substantial central portion of the screw, and the resin is returned to the rear stage of the screw again.

The time required for shearing can be arbitrarily changed based on time required for circulating in the inner feedback screw type structure. The degree of shearing of the resin can be adjusted by varying the gap formed between the tip end surface of the screw and the sealing surface opposed to the tip end surface, and the inner diameter of the inner hole of the screw. In this way, the degree of shearing is more increased as the gap is made narrower and the size of the inner diameter of the hole is made smaller. However, it is necessary to optimize the gap and the inner diameter of the hole of the screw in view of viscosity of the resin. The time required for shearing the resin contained in the cylinder is 1 to 10 minutes.

As described above, according to the present invention, it is possible to melt and shear at least incompatible resin without adding an additive such as a compatibilizer. When it is assumed that one of high molecular components is a matrix by melting and shearing, a high molecular blended product is formed by controlling a disperse phase size of the other high molecular component to be in a size of several tens nanometers.

Example 1

Poly(vinylidene fluoride) (PVDF) and polyamide 11 (PA11) used were commercially available KF850 (Kureha Chemical, Japan) and Rilsan BMN-O (Atofina Co., Ltd.), respectively. All the polymers were dried in a vacuum oven at 100° C. for 12 h before processing.

High-shear processing was performed using a high-shear apparatus, HSE3000mini (Imoto, Co. Japan) as explained in FIG. 1. A feedback-type screw was used in this high-shear apparatus. The L/D ratio of the screw was about 1.78. The rotation speed of the screw used in this study was 1200 rpm, which corresponds to the average shear rate of 1760 sec$^{-1}$ at the region of top part of the screw. The shearing time was varied from 1 to 4 min in this work. No apparent degradation occurs under the present processing conditions from the appearance (sample color) of the obtained blends. Mixed pellets of the two polymers (PVDF/PA11) were melt-blended at 230° C. for the desired shearing time using the high-shear apparatus, and then, the sheets (0.2 mm thickness) were extruded from a T-die. The viscosity ratio between PVDF and PA11 has been measured to be about 1.61 at 230° C. when the shear rate is about 1500 sec$^{-1}$. To compare the dispersed structure of the blend, a normal (low shear) shear apparatus was also used in this study. The rotation speed of the screw in a normal shear apparatus at 100 rpm was estimated to be a shear rate of 50 sec$^{-1}$.

The sections of the PVDF/PA11 blends were observed and analyzed in a high accelerating voltage transmission electron microscopy (TEM), TECNAI G2-F20 (FEI Co. USA) equipped with energy dispersive X-ray (EDX) microanalysis system at 200 kV. For TEM-EDX analysis, electron beams were irradiated to a small spot (diameter 10 nm) and the emitted X-rays were analyzed with the specific EDX spectra counts for 10 sec. For TEM observation, the sample was stained in the vapor phase. First, the trimmed specimen embedded in epoxy resin was stained with solid $OsO_4$ for 2 h in a sealed glass tube. Next, the corresponding specimen was stained with solid $RuO_4$ for 15 min. Then, the stained specimen for TEM was cut into about 120 nm sections with an ultramicrotome Reichert ULTRACUT-UCT and a Diatome diamond knife.

Small-angle X-ray scattering (SAXS) patterns were obtained using micro-focused CuKα radiation (45 kV, 60 mA) generated by an X-ray diffractometer (Rigaku Ultax 4153 A 172B) and an imaging plate detector. The samples were directly used for SAXS measurements. The exposure time is 4 h for each measurement.

The stress-strain curves were measured using a tensile testing machine, Tensilon UMT-300 (Orientec Co. Ltd). Dumbbell-shaped specimens were punched from the extruded sample for the tensile test. Tensile tests were carried out at a rate of 5 mm/min at 20° C. and 50% relative humidity.

Dynamic mechanical properties of all samples were measured with RHEOVIBRON DDV-25FP-S (Orientec Corp.) in a stretching mode. The dynamic storage and loss moduli were determined at a frequency of 10 Hz and a heating rate of 3° $Cmin^{-1}$ as a function of temperature from –150° C. to 175° C.

Figure 4:
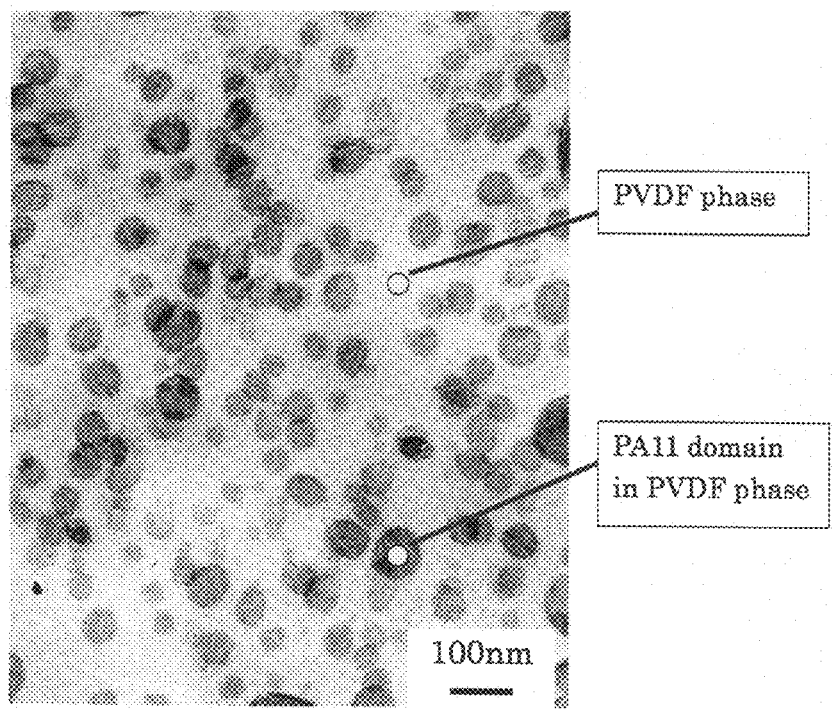
FIG. 4(a) is a TEM image of PVDF/PA11.
FIGS. 4(b) and 4(c) are EDX-TEM spectra of PVDF/PA11=80/20 blend processed at 230° C. for 4 min (screw rotation speed of 1200 rpm).
Figure 4:
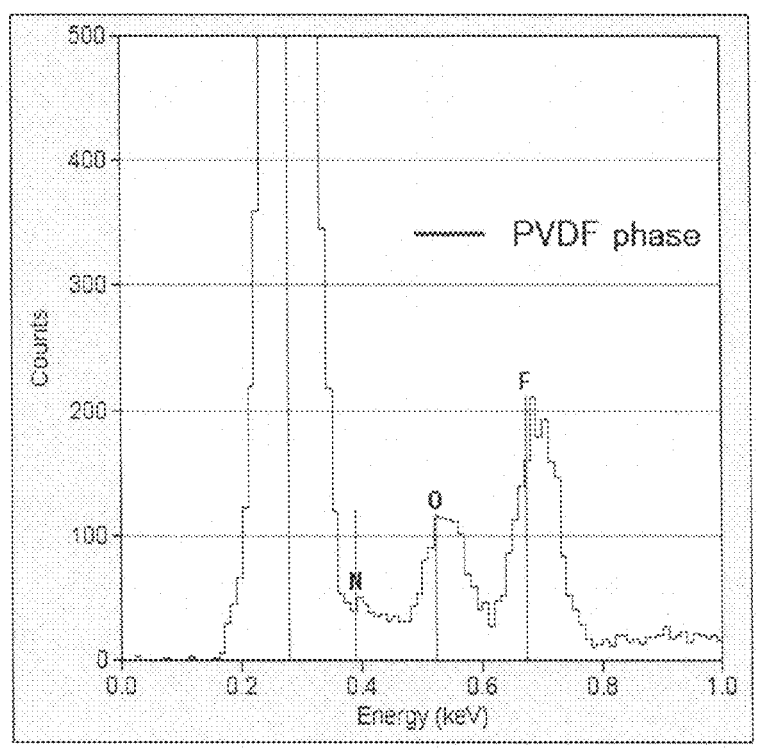
Figure 4:
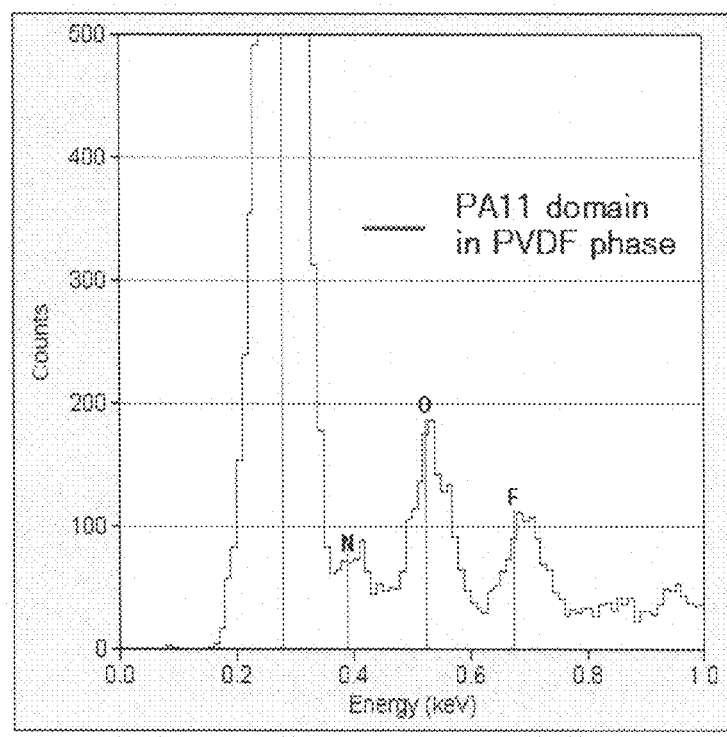

FIG. 4(a) shows a typical TEM image for the high-shear-processed PVDF/PA11 blend. The sample was processed by the high-shear apparatus at 230° C. for 4 min (screw rotation speed of 1200 rpm). In this figure, PA 11 is observed as a dark phase and PVDF is observed as a white phase because PA11 is more readily stained than PVDF. As shown in FIG. 4(a), the nanosized PA11 domains (the dark phase) are estimated to be 20 nm to 100 nm and they are dispersed precisely in the PVDF phase. Moreover, the PA11 lamellar structure was observed clearly in the TEM image. This type of nanodispersed structure of blends is the first example in the world obtained using a simple mechanical blending method without adding compatibilizers to our knowledge. The domain size of the blend is much smaller than 350 nm, which corresponds to the experimental limit until now by using the conventional processing techniques. In addition, the experiments show that the PA11 nanodomain size is hardly affected by mixing time and blend component ratio, while the number of nanodomains is significantly increased by prolonging mixing time. It is worth noting that nanostructured PVDF/PA11 blends are very stable thermodynamically against thermal annealing. The blend structure processed at a high shear was unchanged by the remelt conditions.

To elucidate the component interactions for the high-shear-processed blend, energy dispersive X-ray (EDX) microanalysis was used for elemental analysis of each part in FIG. 4(a). FIGS. 4(b) and 4(c) show the EDX spectra of the respective parts designated in FIG. 4(a). In these figures, the horizontal axis represents the energy corresponding to the specific X-ray emitted and the vertical axis represents intensity counts of the X-ray. In FIGS. 4(b) and 4(c), the most intense peak observed at 0.28 keV was assigned to the specific X-ray of carbon (C). The relatively intense peaks originating from nitrogen (N) at 0.39 keV and oxygen (O) at 0.52 keV were clearly observed in the PVDF phase designated in FIG. 4(a), which suggest that the PA11 chains are mixed with the PVDF chains in the nanospots with a diameter of 10 nm. Although the stained PA11 domain was only observed in the other spot of FIG. 4(a), an intense peak originating from fluorine (F) was clearly observed at 0.67 keV in the EDX spectrum of FIG. 4(c). This result indicates that the PVDF chains interpenetrated in the PA11 domain. The EDX-TEM results suggest that both the PVDF and PA11 chains mixed with each other after the high-shear processing. Therefore, the miscibility between PVDF and PA11 was improved by the high-shear processing to form a partially miscible state with the nanosize dispersion.

Figure 5:
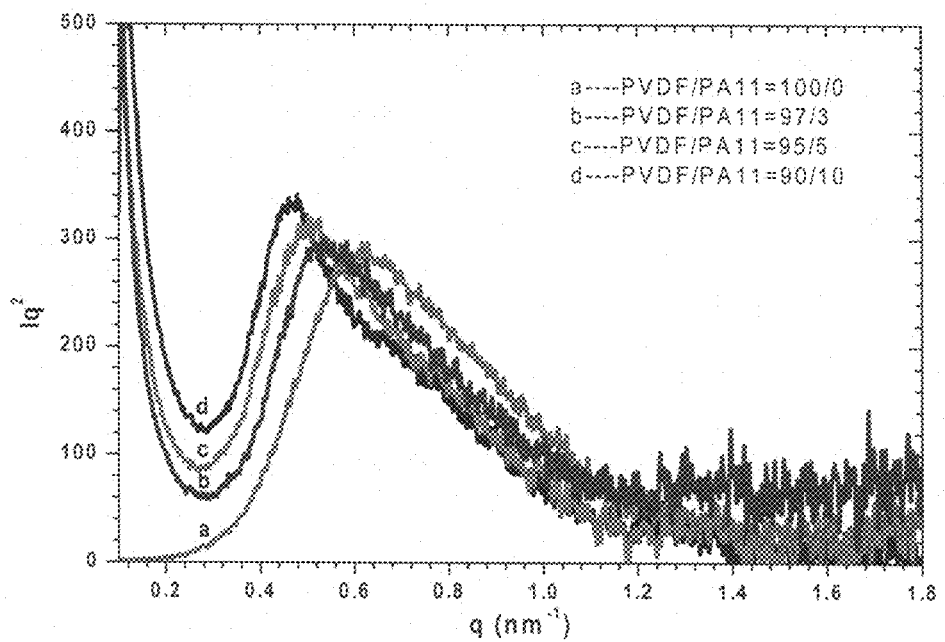
FIGS. 5(a) and 5(b) are SAXS profiles of PVDF, PA11 and PVDF/PA11 nanoblends at room temperature.
Figure 5:
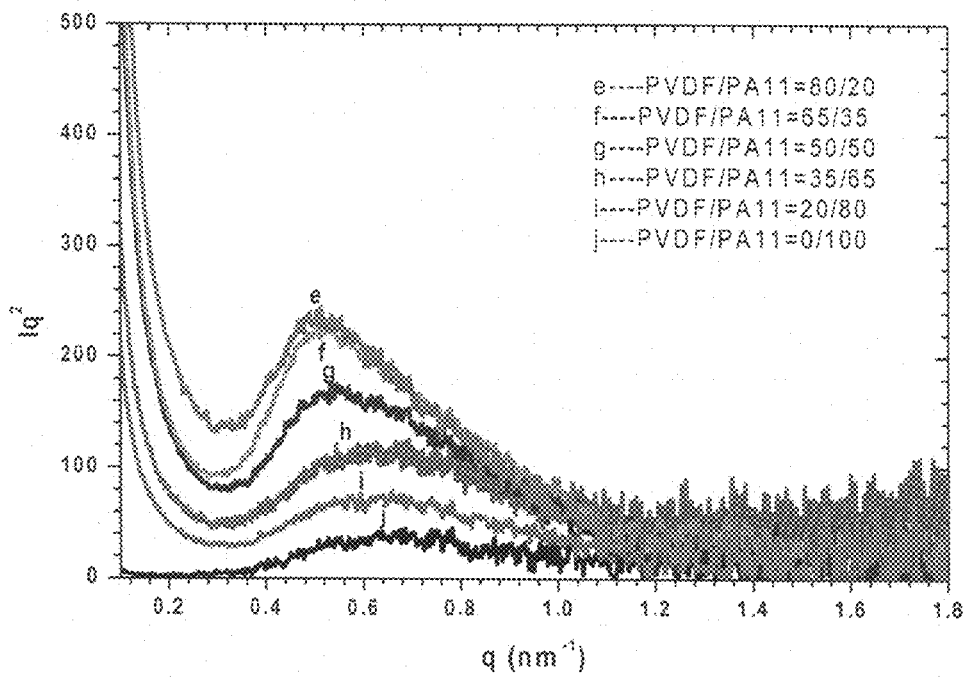

EXD-TEM investigation has shown the molecular chain interpenetrating state for the high-shear-processed blend because of the coexistence of F, N, and O within the nanospots with a diameter of about 10 nm. Small-angle X-ray scattering (SAXS) was used to elucidate the lamellar structures of the prepared novel nanoblend. FIG. 5 shows the Lorentz-corrected SAXS profiles of PVDF/PA11 nanoblends with various component ratios. SAXS intensity was normalized by thickness and exposure time after subtracting air scattering. PVDF exhibits a higher scattering peak than PA11 because of its higher electron density contrast between its alternating crystalline and amorphous layers. By comparing the scattering curves of the blends and pure polymers, it can be seen from FIG. 5 that all the high-shear-processed blends show a very strong scattering in the low-scattering-angle region (q<0.1 $nm^{-1}$), termed "zero-angle scattering". The strong "zero-angle scattering" indicates the nanodomains in the blends. The scattering intensity of this "zero-angle scattering" monotonically decreases as a function of the scattering vector characteristic of a spherical morphology, where the spheres (domains) are randomly arranged in space, which is consistent with the TEM results in FIG. 4(a).

The average long period (L), crystalline lamella thickness (Lc) and amorphous layer thickness (La) can be calculated by a one-dimensional correlation function method from FIG. 5, assuming a dual phase model for crystalline polymers. Table 1 gives the changes in the three average parameters as functions of the composition ratio of the nanoblend, as well as that of the same blend processed at a low shear rate. The fact that the high-shear-processed blend samples show an enlarged long period and an amorphous layer thickness indicates the chain incorporation between PVDF and PA11 during the high-shear processing. These results are highly consistent with those of the EDX-TEM analysis. In contrast, there is no change in the long period for the low-shear-processed sample, indicating the immiscibility between PVDF and PA11 at a low shear rate. From the results of SAXS and TEM-EDX measurements, it is suggested that PVDF and PA11 molecular chains insert into the amorphous region of the other component and result in an extended long period of the lamellar structure.

Figure 6:
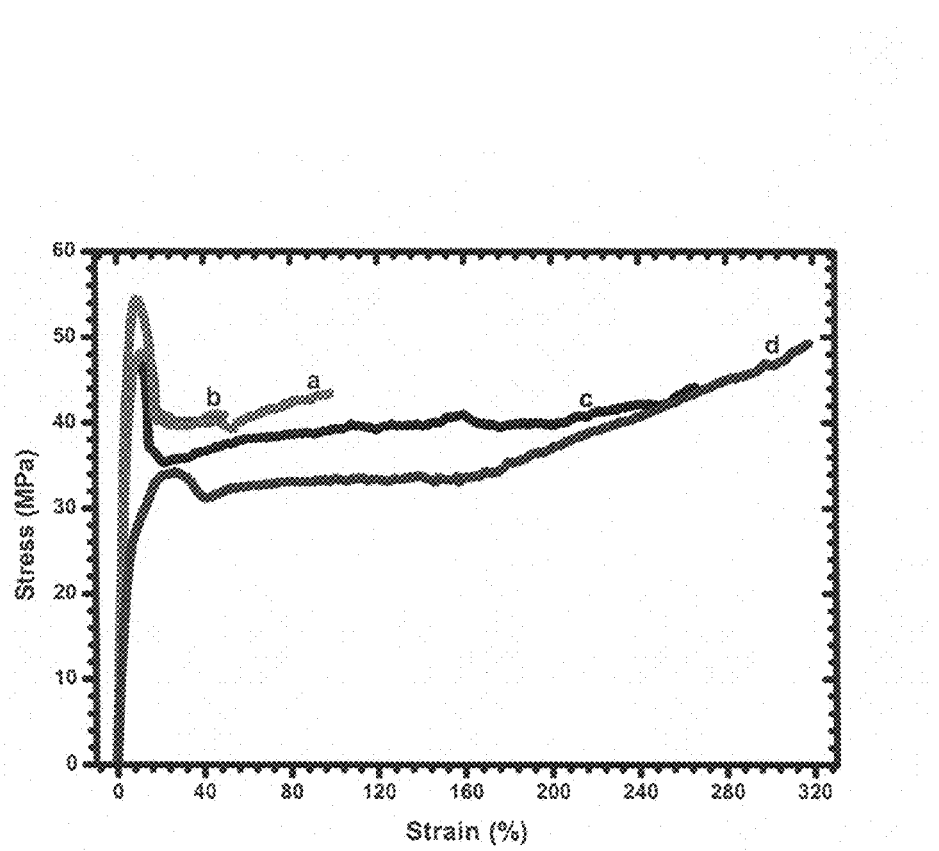
FIG. 6 is Stress-strain curves of neat PVDF (a), PVDF/PA11=80/20 blends processed at low shear (b), PVDF/PA11=80/20 blends processed at high shear (c), and neat PA11 (d).

FIG. 6 shows the stress-strain curves of neat PVDF (a), PVDF/PA11=80/20 blends processed at a low shear (b), PVDF/PA11=80/20 blends processed at a high shear (c), and neat PA11 (d). The yield stress of the PVDF/PA11=80/20 blend processed at a high shear was almost the same as that of the blend processed at a low shear. Compared with the blend processed at a low shear, however, the nanostructured blend processed at a high shear shows significantly increased elongation at breakup. It is found that the elongation at breakup of the nanostructured PVDF/PA11 blend is about 560% higher than that of the same blend prepared under low shear. It is worth noting that the ductility of the nanostructured blend with a small amount of PA11 (20 wt %) is almost equal to that of pure PA11.

Figure 7:
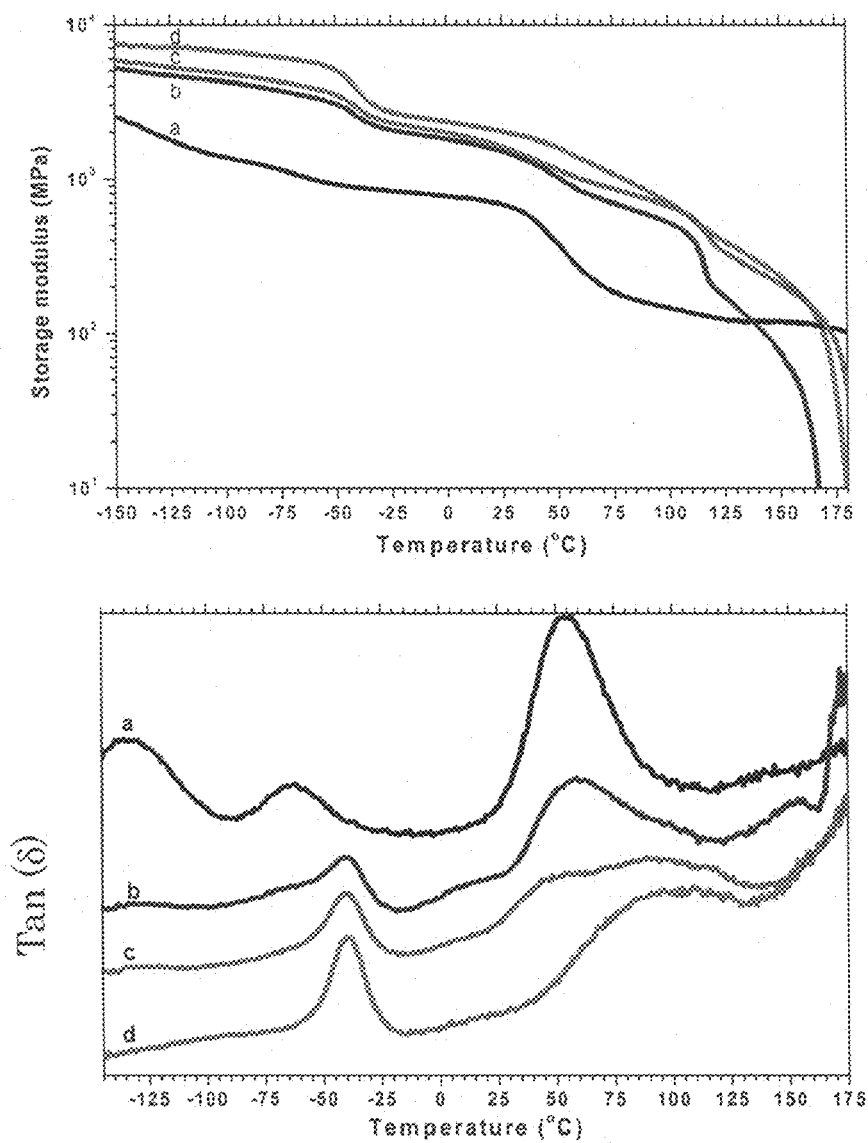
FIG. 7 is Temperature dependence of the dynamic storage modulus and tan(δ) for neat PA11 (a), PVDF/PA11=80/20 blends processed at low shear (b), PVDF/PA11=80/20 blends processed at high shear (c), and neat PVDF (d).

The storage modulus and the glass transition temperature of the obtained nanostructure blend have been investigated and compared with those of the low-shear processed sample by the DMA experiments, as shown in FIG. 7. The storage modulus of the high-shear processed blend is higher than that of the low-shear processed same blend in the whole temperature range. The high-shear processed blend showed an excellent behavior in the storage modulus curve at the higher temperature region than that of the low-shear processed blend. The percentage increase is about 5% at room temperature (20° C.). On the other hand, the glass transition temperature (Tg) of the blend was found to be dependent greatly upon the processing shear rate. As shown in FIG. 7, the Tg of neat PA11 is observed at about 52° C. The Tg of the low-shear processed blend is observed at the same temperature of neat PA11, while that of the high-shear processed sample is remarkably shifted to about 43° C., indicating the improved miscibility between the two components by the high shear processing. To summarize, we have found that high-shear processing without additives can lead to the production of stable nanostructured blends with properties impossible for classical blends to achieve. Here, we demonstrated for the first time the successful preparation of a nanostructured polymer blend, a poly(vinylidene fluoride) (PVDF)/polyamide 11 (PA11) system, in which the PA11 domains with a size of several tens of nanometers are dispersed in the PVDF phase and the nanostructured blends can be produced with a wide range of compositions. The nanostructured polymer blend has a unique combination of properties such as excellent ductility and mechanical properties, which are impossible to achieve with classical processing. Such a novel and simple strategy should be widely applicable to the processing of other immiscible polymer blends. In the near future, the approach developed here will provide various methods of preparing other new materials, which will lead to new applications of already existing polymers.

Table 1. Average structure parameters for PA11/PVDF blends prepared by high-shear (with the shear rate about 1760 $sec^{-1}$) and low-shear (with the shear rate about 50 $sec^{-1}$) processing calculated by one-dimensional correlation function

| PA11/PVDF | 100/0 | 80/20 | 65/35 | 50/50 | 35/65 | 20/80 | 10/90 | 5/95 | 3/97 | 0/100 | 50/50* |
|---|---|---|---|---|---|---|---|---|---|---|---|
| L (nm) | 11.0 | 11.9 | 12.2 | 12.5 | 13.0 | 13.5 | 13.9 | 12.4 | 11.7 | 10.6 | 10.4 |
| Lc (nm) | 4.1 | 4.3 | 4.3 | 4.4 | 4.7 | 5.1 | 5.2 | 4.1 | 3.8 | 3.6 | 3.9 |
| La (nm) | 6.9 | 7.6 | 7.9 | 8.1 | 8.3 | 8.4 | 8.7 | 8.3 | 7.9 | 7.0 | 6.5 |

L: average long period;
Lc: average crystalline thickness;
La: average amorphous part thickness.
*low-shear-processed sample for comparison.

Example 2

Poly(vinylidene fluoride) (PVDF) and polyamide 6 (PA6) used were commercially available KF850 (Kureha Chemical, Japan) and A1030BRL (Unitika Ltd. Japan), respectively. All the polymers were dried in a vacuum oven at 100° C. for 12 h before processing.

High-shear processing was performed using a high-shear apparatus, HSE3000mini (Imoto, Co. Japan) as explained in FIG. 1. A feedback-type screw was used in this apparatus. The L/D ratio of the screw was about 1.78. The rotation speed of the screw used in this study was 1200 rpm, which corresponds to the average shear rate of 1760 $sec^{-1}$ at the region of top part of the screw. The shearing time was varied from 1 to 4 min in this work. No apparent degradation occurs under the present processing conditions from the appearance (sample color) of the obtained blends. Mixed pellets of the two polymers (PVDF/PA6) were melt-blended at 240° C. for the desired shearing time using the apparatus, and then the sheets (0.2 mm thickness) were extruded from a T-die. To compare the dispersed structure of the blend, a normal (low shear) shearing apparatus was also used in this study. The rotation speed of the screw in a normal extruder at 100 rpm was estimated to be a shear rate of 50 $sec^{-1}$.

The sections of the PVDF/PA6 blends were observed and analyzed in a high accelerating voltage transmission electron microscopy (TEM), TECNAI G2-F20 (FEI Co. USA) equipped with energy dispersive X-ray (EDX) microanalysis system at 200 kV. For TEM observation, the sample was stained in the vapor phase. First, the trimmed specimen embedded in epoxy resin was stained with solid $OsO_4$ for 2 h in a sealed glass tube. Next, the corresponding specimen was stained with solid $RuO_4$ for 15 min. Then, the stained specimen for TEM was cut into about 120 nm sections with an ultramicrotome Reichert ULTRACUT-UCT and a Diatome diamond knife.

The stress-strain curves were measured using a tensile testing machine, Tensilon UMT-300 (Orientec Co. Ltd). Dumbbell-shaped specimens were punched from the extruded sample for the tensile test. Tensile tests were carried out at a rate of 5 mm/min at 20° C. and 50% relative humidity.

Figure 8:
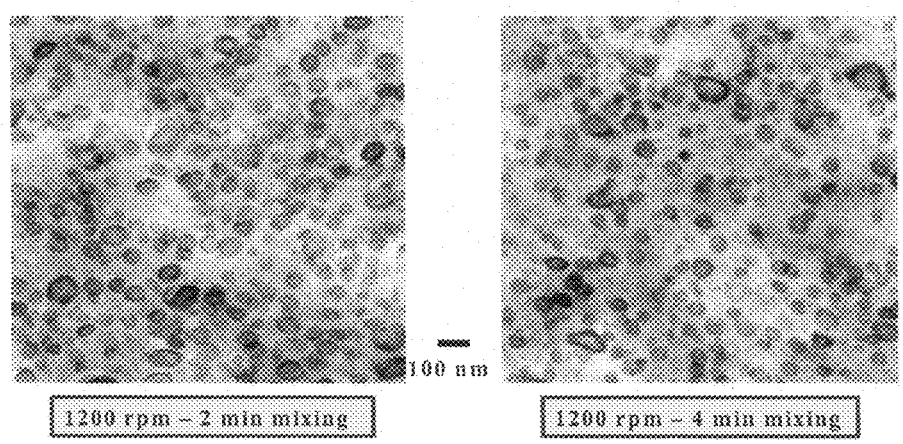
FIG. 8 is TEM images PVDF/PA6=80/20 blend processed (screw rotation speed of 1200 rpm) at 240° C. for 2 min (left) and at 240° C. for 4 min (right).

FIG. 8 shows typical TEM images for the high-shear-processed PVDF/PA6=80/20 blends. The left image is for the sample processed by the high-shear apparatus at 240° C. for 2 min (screw rotation speed of 1200 rpm) and the right one is for the sample processed by 4 min shearing. In this figure, PA 6 is observed as a dark phase and PVDF is observed as a white phase because PA6 is more readily stained than PVDF. As shown in FIG. 8, the nanosized PA6 domains (the dark phase) are estimated to be 20 nm to 100 nm and they are dispersed precisely in the PVDF phase. The experiments show that the size of PA6 nanodomain is hardly affected by shearing time and blend component ratio, while the number of nanodomains is significantly increased by prolonging mixing time. It is worth noting that nanostructured PVDF/PA6 blends are very stable thermodynamically against thermal annealing. The blend structure processed at a high shear was unchanged by the re-melt conditions.

Figure 9:
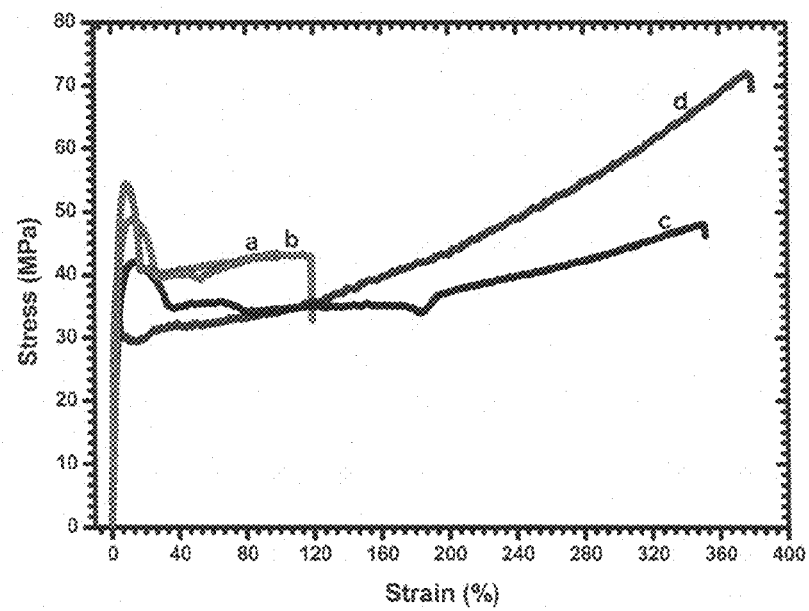
FIG. 9 is Stress-strain curves of neat PVDF (a), PVDF/PA6=80/20 blends processed at low shear (b), PVDF/PA6=80/20 blends processed at high shear (c), and neat PA6 (d).

FIG. 9 shows the stress-strain curves of neat PVDF (a), PVDF/PA6=80/20 blends processed at a low shear (b), PVDF/PA6=80/20 blends processed at a high shear (c), and neat PA6 (d). Compared with the blend processed at a low shear, however, the nanostructured blend processed at a high shear shows significantly increased elongation at breakup (360%). This value is larger than that of the PVDF/PA11 blends. It is found that the elongation at breakup of the nanostructured PVDF/PA6 blend is about 300% higher than that of the same blend prepared under low shear. It is worth noting that the ductility of the nanostructured blend with a small amount of PA6 (20 wt %) is almost equal to that of pure PA6.

The two incompatible resin has a poly(vinylidene fluoride) and a polyamide resin. The polyamide resin comprises one selected from group of a nylon 6, a nylon 11, a nylon 46, or a nylon 66.

The two incompatible resin comprises a poly(vinylidene fluoride) and a polyester resin. The polyester resins comprises one selected from group of a polylactic acid, polycarbonate, poly(ethylene terephthalate), or poly(butylene terephthalate).

What is claimed is:

1. A method for melting and shearing polymers in a cylinder into which an inner feedback screw is inserted, the inner feedback screw having a screw structure at a surface of the inner feedback screw and an inner hole extending from a front end side to a rear end side of the inner feedback screw, a sealing surface being provided at a front end side of the cylinder and facing the front end side of the inner feedback screw so as to form a gap between the sealing surface and the front end side, the method comprising:
(a) supplying polymers into the cylinder from the rear end side of the inner feedback screw;
(b) generating a flow of the supplied polymers on the screw structure of the inner feedback screw in the cylinder by rotating the inner feedback screw;
(c) melting and shearing the polymers by rotating the inner feedback screw, while forwarding the polymers to the front end side of the inner feedback screw;
(d) further rotating the inner feedback screw, thereby filling the polymers into the gap formed between the front end side of the inner feedback screw and the sealing surface provided at the front end side of the cylinder;
(e) further rotating the inner feedback screw, thereby returning the polymers toward the rear end side of the inner feedback screw through the inner hole of the inner feedback screw;
(f) repeating said steps (c) to (e) to circulate the polymers in the cylinder; and
(g) ejecting from the cylinder the polymers which have been melted and sheared,
wherein the method further comprises determining a size of the gap and a size of an inner diameter of the inner hole of the inner feedback screw depending on a viscosity of the polymers.

2. The method according to claim 1, further comprising:
adjusting said gap and/or an inner diameter of the inner hole of the inner feedback screw to adjust intensity of the flow of the polymers and/or degree of shearing, while repeating said steps (c) to (e).

3. The method according to claim 1 or 2, wherein the inner feedback screw is rotated at a speed from 600 rpm to 3000 rpm.

4. A method for producing a polymer blend by melting and shearing polymers in a cylinder into which an inner feedback screw is inserted, the inner feedback screw having a screw structure at a surface of the inner feedback screw and an inner hole extending from a front end side to a rear end side of the inner feedback screw, a sealing surface being provided at a front end side of the cylinder and facing the front end side of the inner feedback screw so as to form a gap between the sealing surface and the front end side, the method comprising:
(a) supplying polymers into the cylinder from the rear end side of the inner feedback screw;
(b) generating a flow of the supplied polymers on the screw structure of the inner feedback screw in the cylinder by rotating the inner feedback screw;
(c) melting and shearing the polymers by rotating the inner feedback screw, while forwarding the polymers to the front end surface side of the inner feedback screw;
(d) further rotating the inner feedback screw, thereby filling the polymers into the gap formed between the front end side of the inner feedback screw and the sealing surface provided at the front end side of the cylinder;
(e) further rotating the inner feedback screw, thereby returning the polymers toward the rear end side of the inner feedback screw through the inner hole of the inner feedback screw;
(f) repeating said steps (c) to (e) to circulate the polymers in the cylinder; and
(g) obtaining the polymer blend by ejecting from the cylinder the polymers which have been melted and sheared,
wherein the method further comprises determining a size of the gap and a size of an inner diameter of the inner hole of the inner feedback screw depending on a viscosity of the polymers.

5. The method according to claim 4, wherein the polymer blend comprises a first polymer and a second polymer, the second polymer being dispersed in a matrix phase of the first polymer.

6. The method according to claim 4, wherein the polymer blend comprises a first polymer and a second polymer, and wherein chains of the first polymer are mixed with chains of the second polymer.

7. A method for melting and shearing polymers in a cylinder into which an inner feedback screw is inserted, the inner feedback screw having a screw structure at a surface of the inner feedback screw and an inner hole extending from a front end side to a rear end side of the inner feedback screw, a sealing surface being provided at a front end side of the cylinder and facing the front end side of the inner feedback screw, the method comprising:
(a) supplying polymers into the cylinder from the rear end side of the inner feedback screw;
(b) generating a flow of the supplied polymers on the screw structure of the inner feedback screw in the cylinder by rotating the inner feedback screw;
(c) melting and shearing the polymers by rotating the inner feedback screw, while forwarding the polymers to the front end side of the inner feedback screw;
(d) further rotating the inner feedback screw, thereby returning the polymers from the front end side of the inner feedback screw toward the rear end side of the inner feedback screw through the inner hole of the inner feedback screw;
(e) repeating said steps (c) to (d) to circulate the polymers in the cylinder; and
(f) ejecting from the cylinder the polymers which have been melted and sheared,
wherein the method further comprises determining a size of the gap and a size of an inner diameter of the inner hole of the inner feedback screw depending on a viscosity of the polymers.

8. A method for producing a polymer blend by melting and shearing polymers in a cylinder into which an inner feedback screw is inserted, the inner feedback screw having a screw structure at a surface of the inner feedback screw and an inner hole extending from a front end side to a rear end side of the inner feedback screw, a sealing surface being provided at a front end side of the cylinder and facing the front end side of the inner feedback, the method comprising:
(a) supplying polymers into the cylinder from the rear end side of the inner feedback screw;
(b) generating a flow of the supplied polymers on the screw structure of the inner feedback screw in the cylinder by rotating the inner feedback screw;
(c) melting and shearing the polymers by rotating the inner feedback screw, while forwarding the polymers to the front end side of the inner feedback screw;
(d) further rotating the inner feedback screw, thereby returning the polymers from the front end side of the inner feedback screw toward the rear end side of the inner feedback screw through the inner hole of the inner feedback screw;
(e) repeating said steps (c) to (d) to circulate the polymers in the cylinder; and
(f) obtaining the polymer blend by ejecting from the cylinder the polymers which have been melted and sheared,
wherein the method further comprises determining a size of an inner diameter of the inner hole of the inner feedback screw depending on a viscosity of the polymers.

* * * * *